(12) United States Patent
Zheng et al.

(10) Patent No.: US 12,381,921 B2
(45) Date of Patent: Aug. 5, 2025

(54) CONFERENCE TERMINAL AND CONTROL METHOD AND APPARATUS THEREOF

(71) Applicant: HUAWEI TECHNOLOGIES CO., LTD., Guangdong (CN)

(72) Inventors: Zhiwei Zheng, Dongguan (CN); Yi Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 30 days.

(21) Appl. No.: 18/413,005

(22) Filed: Jan. 15, 2024

(65) Prior Publication Data

US 2024/0155009 A1    May 9, 2024

Related U.S. Application Data

(63) Continuation of application No. PCT/CN2022/091615, filed on May 9, 2022.

(30) Foreign Application Priority Data

Sep. 9, 2021    (CN) .......................... 202111056831.7

(51) Int. Cl.
*G06F 15/16*    (2006.01)
*G06F 9/48*    (2006.01)
(Continued)

(52) U.S. Cl.
CPC ........ *H04L 65/4015* (2013.01); *G06F 9/4843* (2013.01); *G06F 3/048* (2013.01)

(58) Field of Classification Search
CPC ..... H04L 65/4015; G06F 3/048; G06F 9/4843
(Continued)

(56) References Cited

U.S. PATENT DOCUMENTS 8,368,423 B2 *   2/2013   Yancey ............... G06F 15/7867
                                                                712/15
8,484,292 B2 *   7/2013   Spataro ............... G06Q 10/107
                                                                709/205
(Continued)

FOREIGN PATENT DOCUMENTS

CN          103024156 A        4/2013
CN          103313028 A        9/2013
(Continued)

OTHER PUBLICATIONS

Anonymous: "How to magnify the screen in Windows 10 | My Computer MyWay", [online], https://mcmw.abilitynet.org.uk/windows-10-magnifying-screen, Dec. 7, 2018 (Dec. 7, 2018), XP093205701, total 13 pages.
(Continued)

*Primary Examiner* — Moustafa M Meky

(57) ABSTRACT

This application discloses a conference terminal and a control method and apparatus thereof, and belongs to the field of computer technologies. The method is applied to the conference terminal, and the conference terminal displays a graphical interface. The method includes: receiving a clone interface starting instruction, where the clone interface starting instruction instructs to display a clone interface of the graphical interface on the conference terminal; displaying the clone interface on the conference terminal in response to the clone interface starting instruction; receiving a user operation instruction executed on the clone interface; and in response to the user operation instruction, performing, on the clone interface, an operation instructed by the user operation instruction.

18 Claims, 7 Drawing Sheets

(51) Int. Cl.
*H04L 65/401* (2022.01)
*G06F 3/048* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 8,621,379 | B2* | 12/2013 | Davydov | G06F 3/0486 |
| | | | | 345/173 |
| 9,444,884 | B2* | 9/2016 | Newton | H04L 67/148 |
| 9,794,760 | B2* | 10/2017 | Quatrano | H04L 67/02 |
| 10,108,613 | B2* | 10/2018 | Spataro | G06Q 10/10 |
| 11,323,510 | B2* | 5/2022 | Yevmenkin | H04L 67/101 |
| 11,436,938 | B2* | 9/2022 | Mallin | G06F 3/167 |
| 11,595,397 | B2* | 2/2023 | Carbune | H04L 63/102 |
| 12,041,057 | B2* | 7/2024 | Carbune | G06F 21/629 |
| 2005/0086328 | A1* | 4/2005 | Landram | H04L 67/34 |
| | | | | 709/228 |
| 2006/0168528 | A1 | 7/2006 | Gruen | |
| 2007/0239488 | A1* | 10/2007 | DeRosso | G16H 30/20 |
| | | | | 705/3 |
| 2009/0070670 | A1 | 3/2009 | Kishi | |
| 2009/0087871 | A1* | 4/2009 | Kanacher | C12Q 1/44 |
| | | | | 435/325 |
| 2009/0222276 | A1* | 9/2009 | Romney | G06F 16/986 |
| | | | | 707/E17.116 |
| 2010/0205179 | A1* | 8/2010 | Carson | G06F 16/9535 |
| | | | | 707/E17.089 |
| 2010/0332664 | A1* | 12/2010 | Yevmenkin | H04L 67/141 |
| | | | | 709/227 |
| 2011/0153981 | A1* | 6/2011 | Yancey | G06F 15/7867 |
| | | | | 712/15 |
| 2013/0080467 | A1* | 3/2013 | Carson | G06F 16/9536 |
| | | | | 707/769 |
| 2013/0173806 | A1* | 7/2013 | Newton | H04L 67/1014 |
| | | | | 709/226 |
| 2013/0174177 | A1* | 7/2013 | Newton | H04L 67/148 |
| | | | | 718/105 |
| 2015/0058796 | A1 | 2/2015 | Thakur et al. | |
| 2018/0361045 | A1* | 12/2018 | Griessmann | G06F 3/0484 |
| 2020/0258417 | A1* | 8/2020 | Mallin | G06F 3/16 |
| 2020/0389460 | A1* | 12/2020 | Carbune | H04L 67/306 |
| 2022/0415206 | A1* | 12/2022 | Mallin | G06F 3/0482 |
| 2023/0171258 | A1* | 6/2023 | Carbune | H04L 67/54 |
| | | | | 726/4 |

FOREIGN PATENT DOCUMENTS

| | | |
|---|---|---|
| CN | 105718190 A | 6/2016 |
| CN | 106899763 A | 6/2017 |

OTHER PUBLICATIONS

Support-Dolphin Computer Access: "Learn SuperNova: Magnifier Views",, [online], https://www.youtube.com/watch?v=bbj57oK5uLQ, Feb. 4, 2021 (Feb. 4, 2021), XP093205703, total 2 pages.

* cited by examiner

CONFERENCE TERMINAL AND CONTROL METHOD AND APPARATUS THEREOF

CROSS-REFERENCE TO RELATED APPLICATIONS

This application is a continuation of International Application No. PCT/CN2022/091615, filed on May 9, 2022, which claims priority to Chinese Patent Application No. 202111056831.7, filed on Sep. 9, 2021. The disclosures of the aforementioned applications are hereby incorporated by reference in their entireties.

TECHNICAL FIELD

This application relates to the field of computer technologies, and in particular, to a conference terminal and a control method and apparatus thereof.

BACKGROUND

With the expansion of enterprise services and the rapid development of the information age, more enterprises choose a video conference for real-time communication. In addition, because the video conference needs to meet a specific conference scale, a size of a display screen of a conference terminal of the video conference is usually large. Therefore, how to control the conference terminal is an important direction of current research on the conference terminal.

In a conventional technology, a terminal is usually additionally configured for the conference terminal. A user may perform an operation on the conference terminal on the additionally configured terminal. After receiving the operation of the user, the additionally configured terminal performs, on the conference terminal, an operation indicated by the user, so that the user controls the conference terminal.

However, costs of controlling the conference terminal are high.

SUMMARY

This application provides a conference terminal and a control method and apparatus thereof. In this application, costs of controlling the conference terminal can be reduced, a user can perform an operation on the conference terminal more easily, and interaction experience of controlling the conference terminal by the user is ensured. Technical solutions provided in this application are as follows.

According to a first aspect, this application provides a conference terminal control method, where the method is applied to a conference terminal, and the conference terminal displays a graphical interface. The method includes: receiving a clone interface starting instruction, where the clone interface starting instruction instructs to display a clone interface of the graphical interface on the conference terminal; displaying the clone interface on the conference terminal in response to the clone interface starting instruction; receiving a user operation instruction executed on the clone interface; and in response to the user operation instruction, performing, on the clone interface, an operation instructed by the user operation instruction.

In the conference terminal control method, after receiving the clone interface starting instruction, the conference terminal can display the clone interface on the conference terminal in response to the clone interface starting instruction, and after receiving the user operation instruction executed on the clone interface, in response to the user operation instruction, the conference terminal can perform, on the clone interface, the operation instructed by the user operation instruction. Because the clone interface can display content displayed on the graphical interface in a clone manner, the user can implement an operation on the graphical interface by performing the operation on the clone interface, and can further control the conference terminal. In comparison with a conventional technology, no terminal needs to be additionally configured for the conference terminal, and costs of controlling the conference terminal are reduced. In addition, by performing the operation on the clone interface, an operation on a cloned area of the graphical interface can be implemented, operation difficulty in an area of the graphical interface is reduced, and interaction experience of controlling the conference terminal by the user is ensured.

In an implementation, a display area of the clone interface is less than a display area of the cloned area of the graphical interface. In this case, the conference terminal may be a conference terminal that uses a large display screen to display information to participants in a conference scenario. Because the conference terminal has a large display screen, when the cloned area of the graphical interface is excessively far away from an operator of the conference terminal, the operator of the conference terminal can control the conference terminal to display the clone interface. In addition, the cloned area of the graphical interface includes an area that cannot be touched by the operator on the graphical interface, so that the user controls the conference terminal by performing the operation on the clone interface.

In another implementation, a display area of the clone interface is greater than a display area of the cloned area of the graphical interface. In this case, the conference terminal may be a conference terminal having high display density in at least some areas. In this case, the clone interface display, in the clone manner, an area having high display density, so that magnification display of the area having high display density can be implemented, and an operator of the conference terminal can implement, on the clone interface on which magnification display is performed, an operation on the area having high display density, to reduce difficulty of performing an operation on the area having high display density by the operator.

Optionally, the clone interface starting instruction is triggered by using a touchscreen of the conference terminal, the clone interface starting instruction is triggered by using a key of the conference terminal, the clone interface starting instruction is a voice instruction, or the clone interface starting instruction is a limb instruction. When a form of a limb is a preset posture, the clone interface starting instruction may be triggered. Alternatively, when a distance between the limb and a display screen is less than a distance threshold, the clone interface starting instruction may be triggered.

In an implementation, the displaying the clone interface on the conference terminal in response to the clone interface starting instruction includes: determining an attribute parameter of the clone interface in response to the clone interface starting instruction, where the attribute parameter includes one or more of the following: a size, a display position, and a position of the cloned area of the graphical interface; and displaying the clone interface on the conference terminal based on the attribute parameter.

Optionally, after the displaying the clone interface on the conference terminal in response to the clone interface starting instruction, the method further includes: receiving a clone interface adjustment instruction, where the clone interface adjustment instruction instructs to adjust the attribute parameter of the clone interface, and the attribute parameter includes one or more of the following: the size, the display position, and the position of the cloned area of the graphical interface; and displaying the clone interface based on an adjusted attribute parameter in response to the clone interface adjustment instruction.

In a possible implementation, the size of the clone interface is determined based on any one of the following: a parameter input on a setting interface of the conference terminal, a parameter input through voice control, a parameter input through limb control, and a parameter automatically determined based on a posture of the user.

In a possible implementation, the display position of the clone interface is determined based on any one of the following: a parameter input on a setting interface of the conference terminal, a parameter input through voice control, a parameter input through limb control, a parameter automatically determined based on an area that can be touched by the user, and a parameter automatically determined based on a position of an orthographic projection of a face of the user on the display screen of the conference terminal.

In a possible implementation, the position of the cloned area is determined based on any one of the following: a parameter input on a setting interface of the conference terminal, a parameter input through voice control, a parameter input through limb control, a parameter automatically determined based on an area that can be touched by the user, and a parameter automatically determined based on a position of an orthographic projection of a face of the user on the display screen of the conference terminal.

When the attribute parameter of the clone interface is automatically determined based on the posture of the user, the position of the face, and the like, and the clone interface is displayed based on the attribute parameter, automatic display and automatic adjustment of the conference terminal can be implemented, and an intelligence degree of the conference terminal is further improved, to help further improve the interaction experience of controlling the conference terminal by the user.

In a possible implementation, the method further includes: receiving a clone interface closing instruction, where the clone interface closing instruction instructs to stop displaying the clone interface on the conference terminal; and in response to the clone interface closing instruction, stopping displaying the clone interface on the conference terminal.

Before the stopping displaying the clone interface on the conference terminal, the method further includes: displaying, in response to the clone interface closing instruction, a message of asking to quit a display mode of the clone interface or minimize the clone interface. Correspondingly, in response to an instruction of quitting the display mode of the clone interface, the conference terminal can stop displaying the clone interface on the conference terminal, and quit the display mode of the clone interface. In response to an instruction of minimizing the clone interface, the conference terminal can stop displaying the clone interface on the conference terminal, and run the display mode of the clone interface in a background of the conference terminal.

When the clone interface closing instruction is received, the message of asking to quit the display mode of the clone interface or minimize the clone interface is displayed, and a corresponding operation is performed for a response of the user to the message, so that the clone interface closing instruction can be executed based on a desire of the user, and operation experience of the user on the conference terminal is ensured.

Optionally, the clone interface closing instruction may be triggered by using the touchscreen of the conference terminal, the clone interface starting instruction is triggered by using the key of the conference terminal, the clone interface starting instruction is the voice instruction, or the clone interface starting instruction is the limb instruction.

Optionally, the user operation instruction may indicate the conference terminal to perform a conference-related operation. For example, the user operation instruction instructs any one of the following: entering a conference interface, quitting the conference interface, adjusting a presentation mode of a conference, adjusting presented content of the conference, and inputting conference content on the clone interface.

In a possible implementation, a display may display the clone interface in a superimposed manner on the graphical interface originally displayed on the display screen. In other words, both the graphical interface and the clone interface are displayed on the display screen, and the clone interface is displayed on an upper layer of the graphical interface, so that when viewing content displayed on the display screen, in an area in which the clone interface is displayed, the user can view only content on the clone interface. Alternatively, when the clone interface is displayed on the display screen, the graphical interface may not be displayed (for example, all areas on the display screen except areas of the clone interface are set to black or other colors), or the graphical interface on which processing has been performed may be displayed. Optionally, the processing on the graphical interface may include any one of the following: blurring processing and graffiti processing. When no graphical interface is displayed or the graphical interface on which processing has been performed is displayed, the content of the clone interface is displayed in an area in which content is displayed on the display screen, so that the user can focus on the clone interface when watching the display screen, and viewing efficiency of the clone interface is improved.

According to a second aspect, this application provides a conference terminal control apparatus, where the apparatus is deployed in a conference terminal, the conference terminal displays a graphical interface, and the apparatus includes: a receiving unit, configured to receive a clone interface starting instruction, where the clone interface starting instruction instructs to display a clone interface of the graphical interface on the conference terminal; and an executing unit, configured to display the clone interface on the conference terminal in response to the clone interface starting instruction, where the receiving unit is further configured to receive a user operation instruction executed on the clone interface; and the executing unit is further configured to: in response to the user operation instruction, perform, on the clone interface, an operation instructed by the user operation instruction.

Optionally, a display area of the clone interface is less than a display area of a cloned area of the graphical interface.

Optionally, a display area of the clone interface is greater than a display area of a cloned area of the graphical interface.

Optionally, the clone interface starting instruction is triggered by using a touchscreen of the conference terminal, the clone interface starting instruction is triggered by using a key of the conference terminal, the clone interface starting instruction is a voice instruction, or the clone interface starting instruction is a limb instruction.

Optionally, the executing unit is configured to: determine an attribute parameter of the clone interface in response to the clone interface starting instruction, where the attribute parameter includes one or more of the following: a size, a display position, and a position of the cloned area of the graphical interface; and display the clone interface on the conference terminal based on the attribute parameter.

Optionally, the receiving unit is further configured to receive a clone interface adjustment instruction, where the clone interface adjustment instruction instructs to adjust the attribute parameter of the clone interface, and the attribute parameter includes one or more of the following: the size, the display position, and the position of the cloned area of the graphical interface; and the executing unit is further configured to display the clone interface based on an adjusted attribute parameter in response to the clone interface adjustment instruction.

Optionally, the size of the clone interface is determined based on any one of the following: a parameter input on a setting interface of the conference terminal, a parameter input through voice control, a parameter input through limb control, and a parameter automatically determined based on a posture of a user.

Optionally, the display position of the clone interface is determined based on any one of the following: a parameter input on a setting interface of the conference terminal, a parameter input through voice control, a parameter input through limb control, a parameter automatically determined based on an area that can be touched by a user, and a parameter automatically determined based on a position of an orthographic projection of a face of the user on a display screen of the conference terminal.

Optionally, the position of the cloned area is determined based on any one of the following: a parameter input on a setting interface of the conference terminal, a parameter input through voice control, a parameter input through limb control, a parameter automatically determined based on an area that can be touched by a user, and a parameter automatically determined based on a position of an orthographic projection of a face of the user on a display screen of the conference terminal.

Optionally, the receiving unit is further configured to receive a clone interface closing instruction, where the clone interface closing instruction instructs to stop displaying the clone interface on the conference terminal; and the executing unit is further configured to: in response to the clone interface closing instruction, stop displaying the clone interface on the conference terminal.

Optionally, the executing unit is further configured to: display, in response to the clone interface closing instruction, a message of asking to quit a display mode of the clone interface or minimize the clone interface.

Optionally, the user operation instruction instructs any one of the following: entering a conference interface, quitting the conference interface, adjusting a presentation mode of a conference, adjusting presented content of the conference, and inputting conference content on the clone interface.

Optionally, the executing unit is further configured to: when displaying the clone interface on the conference terminal, display the graphical interface on which processing has been performed, where the processing includes any one of the following: blurring processing and graffiti processing.

According to a third aspect, this application provides a conference terminal, including a display screen, a memory, and a processor, where the memory stores program instructions, and the processor runs the program instructions to perform the method according to any one of the first aspect and the possible implementations of the first aspect of this application.

According to a fourth aspect, this application provides a computer-readable storage medium, where the computer readable storage medium is a non-volatile computer-readable storage medium, the computer readable storage medium includes program instructions, and when the program instructions are run on a computer device, the computer device is enabled to perform the method according to any one of the first aspect and the possible implementations of the first aspect of this application.

According to a fifth aspect, this application provides a computer program product including instructions. When the computer program product runs on a computer, the computer is enabled to perform the method according to any one of the first aspect and the possible implementations of the first aspect of this application.

DESCRIPTION OF EMBODIMENTS

Figure 1:
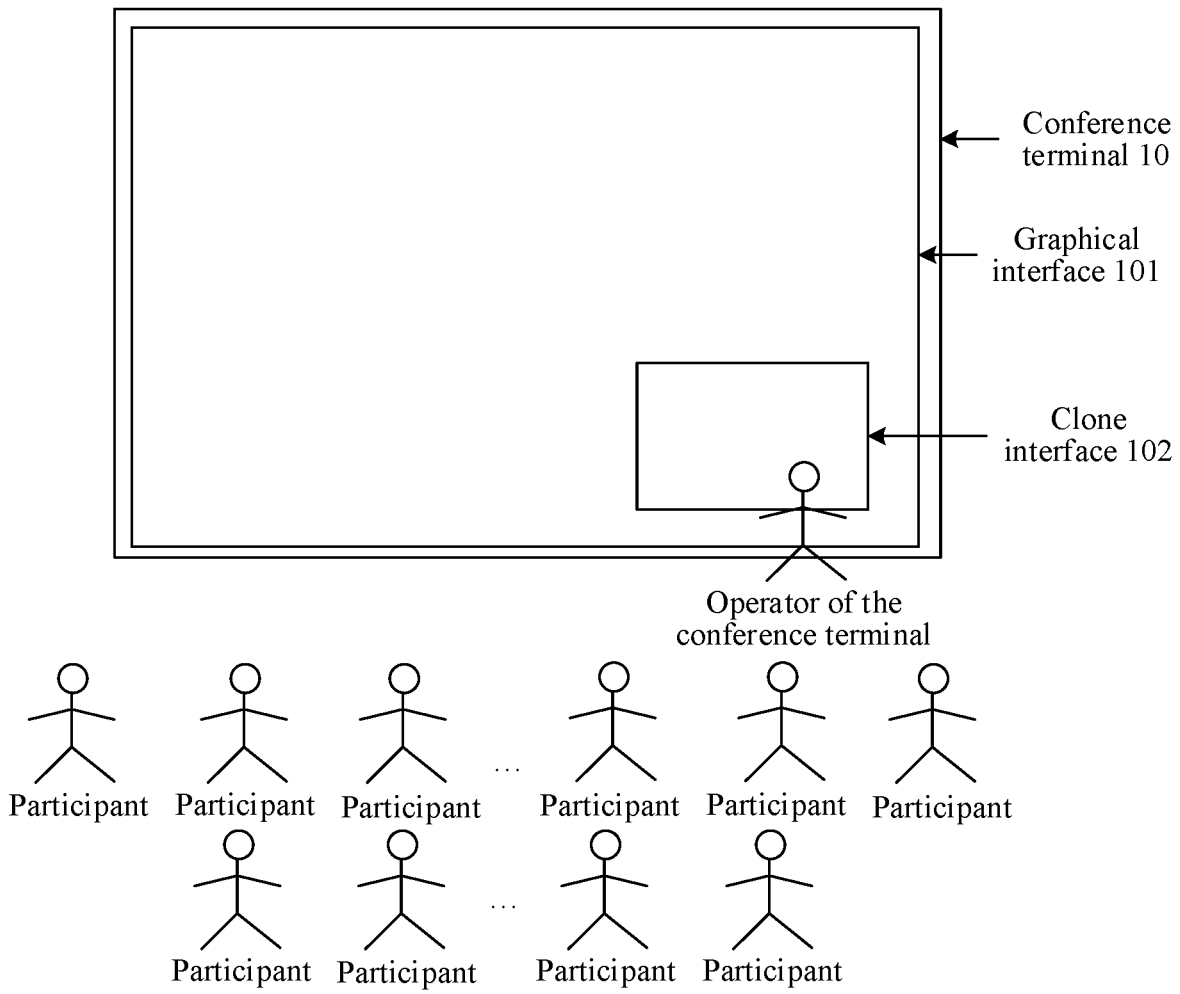
FIG. 1 is a schematic diagram of an application scenario related to a conference terminal control method according to an embodiment of this application.

To make the objectives, technical solutions, and advantages of this application clearer, the following further describes in detail the implementations of this application with reference to the accompanying drawings.

With the expansion of enterprise services and the rapid development of the information age, more enterprises choose video conferences for real-time communication to improve communication efficiency. In addition, because a video conference needs to meet a specific conference scale, a size of a display screen of a conference terminal of the video conference is usually large. As a size of the conference terminal becomes larger, it becomes more inconvenient to control and perform an operation on the conference terminal. In addition, with the diversification of user groups, interaction experience of controlling and operating the conference terminal also becomes particularly important. In a conference process, the conference terminal may display content such as a conference-related file, so that the conference can be performed more efficiently.

An embodiment of this application provides a conference terminal control method. The method is applied to a conference terminal. The conference terminal may be a terminal which is difficult to directly perform an operation on due to a screen size of the terminal, and is a terminal used in a conference. In embodiments of this application, the conference refers to an activity in which a plurality of people participate in a discussion, and a typical representative of the conference includes an assembly activity in which a plurality of people discuss affairs (for example, an assembly activity in which a plurality of people discuss project details in an enterprise, or an assembly activity in which a plurality of doctors conduct consultations in a hospital), an educational activity taught by teachers to students, and the like.

In the conference terminal control method, after receiving a clone interface starting instruction, the conference terminal can display a clone interface on the conference terminal in response to the clone interface starting instruction, and after receiving a user operation instruction executed on the clone interface, in response to the user operation instruction, the conference terminal can perform, on the clone interface, an operation instructed by the user operation instruction. Because the clone interface can display content displayed on a graphical interface in a clone manner, a user can implement an operation on the graphical interface by performing the operation on the clone interface, and can further control the conference terminal. In comparison with a conventional technology, no terminal needs to be additionally configured for the conference terminal, and costs of controlling the conference terminal are reduced. In addition, by performing an operation on the clone interface, an operation on the cloned area of the graphical interface can be implemented, operation difficulty in an area of the graphical interface is reduced, and interaction experience of controlling the conference terminal by the user is ensured. The user may be an operator of the conference terminal, for example, a moderator or a narrator of the conference.

The following separately describes the technical solutions provided in this application from a plurality of perspectives, such as an application scenario, a method implementation, a software apparatus, and a hardware apparatus. An application scenario of an embodiment of this application is first described below by using an example.

FIG. 1 is a schematic diagram of an application scenario related to a conference terminal control method according to an embodiment of this application. As shown in FIG. 1, the application scenario includes a conference terminal 10. A display screen of the conference terminal 10 may display a graphical interface 101, and content displayed on the graphical interface may be conference-related content for viewing by participants. In addition, the display screen of the conference terminal 10 may further display a clone interface 102 of some or all areas of the graphical interface 101, and the clone interface 102 is configured to display, in the clone manner, content displayed in the some or all areas of the graphical interface 101. The some or all areas that are of the graphical interface 101 and that are displayed by the clone interface 102 are a cloned area of the graphical interface 101. An operator of the conference terminal may perform an operation on the clone interface 102. After receiving an operation instruction, the conference terminal may respond to the operation instruction and perform, on the cloned area of the clone interface 102, an operation instructed by the operation instruction, so that the operator controls the conference terminal.

Optionally, the application scenario may alternatively include a plurality of conference terminals. Communication connections are established between the plurality of conference terminals, and some or all of the plurality of conference terminals may be controlled according to the conference terminal control method provided in this embodiment of this application. Participants in front of the plurality of conference terminals may have a remote conference by using respectively used conference terminals, and information sharing may be implemented between the plurality of conference terminals through the communication connections.

Optionally, the conference terminal may be an electronic device with a display function, such as a large screen, an electronic whiteboard, a media player, a smart home appliance, or an artificial intelligence device.

Figure 2:
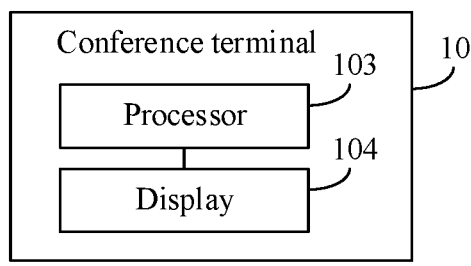
FIG. 2 is a diagram of a logical structure of a conference terminal according to an embodiment of this application.

As shown in FIG. 2, for example, to implement a function of the conference terminal 10 in FIG. 1, the conference terminal 10 may include a processor 103 and a display 104. The processor 103 is configured to: receive an operation of a user, make a decision based on the operation of the user, and perform control based on the decision. The display 104 is configured to perform displaying on the display screen of the conference terminal based on the control of the processor 103. The processor 103 and the display 104 work together to implement the conference terminal control method provided in this embodiment of this application. For example, the display 104 may receive an operation that is performed by the user on the display screen of the conference terminal and that indicates to start a clone interface, and notify the processor 103 of the operation. The processor 103 may generate a clone interface starting instruction based on the operation notified by the display 104, determine attribute parameters such as a size of the clone interface, a display position of the clone interface, and a position of a cloned area, and send the clone interface starting instruction and the attribute parameters of the clone interface to the display 104. The display 104 is configured to: display the clone interface under instruction of the clone interface starting instruction and based on the attribute parameters that are of the clone interface and that are determined by the processor 103. In addition, the display 104 may further receive an operation performed by the user on the clone interface, and notify the processor 103 of the operation, so that the processor 103 generates a corresponding instruction based on the operation, and controls the display 104 to perform, on the clone interface and the cloned area, an operation instructed by the user operation.

In an implementation, to further ensure the interaction experience of controlling the conference terminal by the user, in the conference terminal control method, the conference terminal may further be controlled by combining a plurality of intelligent technologies such as a target detection technology, a target tracking technology, a speech recognition technology, a posture recognition technology, and a ranging technology. Based on the intelligent technologies combined with the conference terminal control method, the conference terminal is further configured with a corresponding function.

Figure 3:
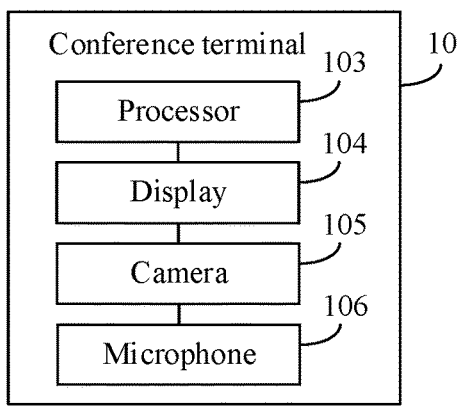
FIG. 3 is a diagram of a logical structure of another conference terminal according to an embodiment of this application.

Optionally, the conference terminal 10 may be configured with some or all of the following functions: an image collection function, an audio collection function, an image processing function, an audio processing function, and an intelligent processing function. The image collection function is configured to collect an image of the user. The audio collection function is configured to collect audio of the user. The image processing function is configured to perform image processing on the image collected by the image collection function, for example, perform processing such as noise reduction, polar line correction, and resolution and frame rate modification on an image frame in a collected video. The audio processing function is configured to perform audio processing on the audio collected by the audio collection function, for example, perform acoustic echo cancellation (AEC) processing, background noise suppression (ANS) processing, and automatic gain control (AGC) processing on the collected audio. The intelligent processing function is configured to implement the foregoing intelligent technologies based on the image and/or audio of the user. Dedicated hardware (such as a smart card) configured to implement the intelligent processing function may be configured in the conference terminal, or the intelligent processing function may be implemented by the processor 103. Optionally, the image collection function may be implemented by using a camera, the audio collection function may be implemented by using a microphone, and both the image processing function and the audio processing function may be implemented by using the processor 103. Correspondingly, when the intelligent processing function, the image processing function, and the audio processing function may all be implemented by using the processor 103, as shown in FIG. 3, the conference terminal 10 in FIG. 2 may further include a camera 105 and a microphone 106.

It should be noted that the foregoing application scenario is merely an example of an application scenario related to the conference terminal control method provided in this embodiment of this application, and is not intended to limit a specific implementation of the application scenario of the method. In addition, an implementation of the conference terminal is not limited to the foregoing descriptions, and may be changed based on an application requirement.

Figure 4:
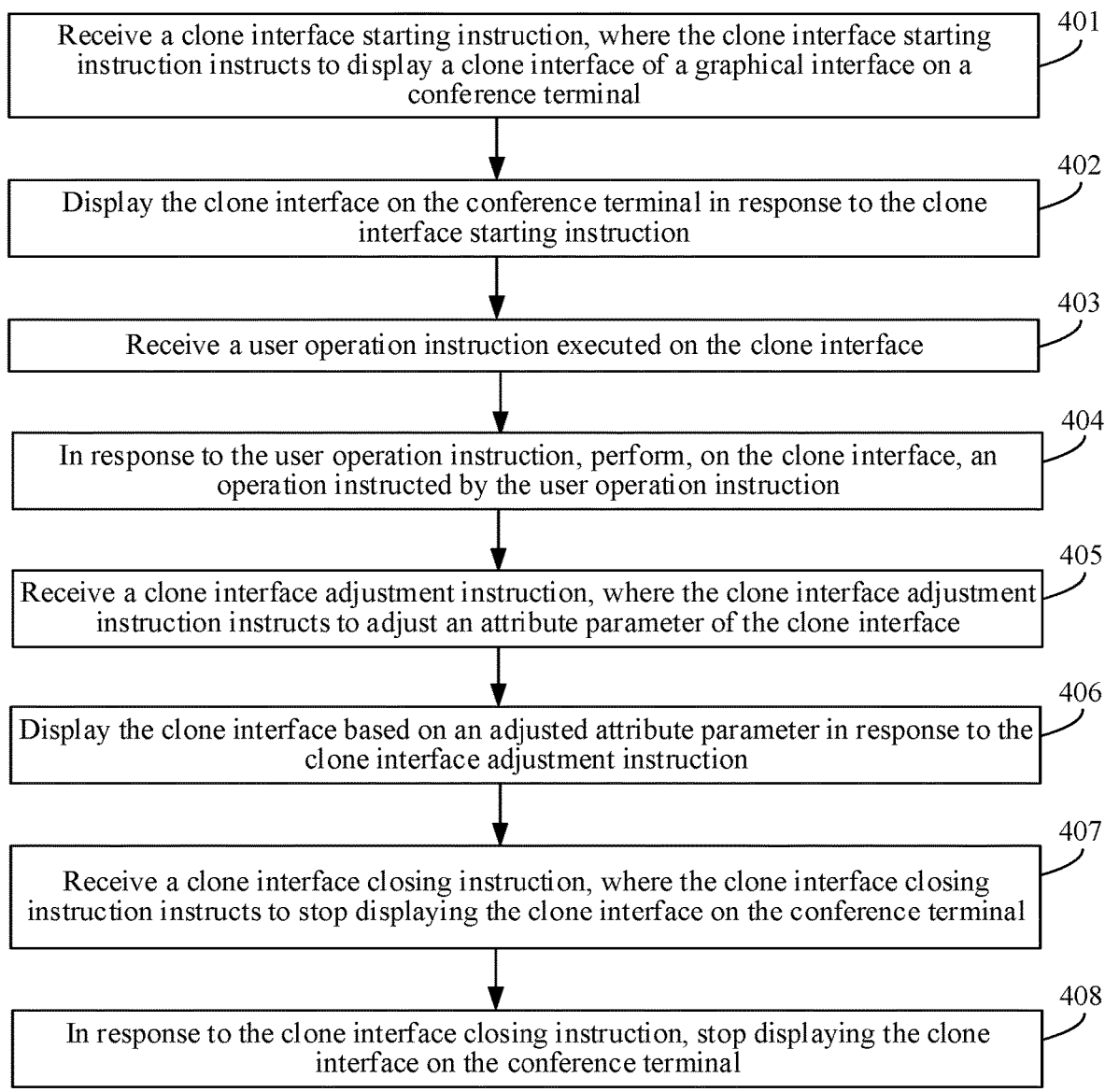
FIG. 4 is a flowchart of a conference terminal control method according to an embodiment of this application.

The following describes an implementation process of the conference terminal control method provided in this embodiment of this application. The method may be applied to the conference terminal, and the conference terminal displays a graphical interface. For example, FIG. 4 is a flowchart of a control method of the conference terminals in FIG. 1 to FIG. 3, and the method may include the following steps.

Step 401: Receive a clone interface starting instruction, where the clone interface starting instruction instructs to display a clone interface of the graphical interface on the conference terminal.

When the user needs the conference terminal to display the clone interface, the user may perform a specified operation to trigger the conference terminal to generate the clone interface starting instruction based on the operation, so that the conference terminal displays the clone interface based on the clone interface starting instruction. The clone interface is configured to display, in the clone manner, content displayed in a cloned area of the graphical interface. Optionally, the clone interface and the cloned area may meet that at least one of display areas and display positions of the clone interface and the cloned area is different. When the conference terminal includes a processor and a display, the clone interface starting instruction may be generated by the processor, and the processor may send the clone interface starting instruction to the display, to indicate the display to display the clone interface on the display screen of the conference terminal.

Optionally, the clone interface starting instruction may be triggered by using a touchscreen of the conference terminal, the clone interface starting instruction is triggered by using a key of the conference terminal, the clone interface starting instruction is a voice instruction, or the clone interface starting instruction is a limb instruction.

For example, a "start" physical key may be disposed on the conference terminal, or the touchscreen of the conference terminal displays a "start" virtual key. After the user presses/taps the "start" physical key or virtual key, the conference terminal generates the clone interface starting instruction based on a press/tap operation of the user. For another example, the audio collection function, the audio processing function, and the intelligent processing function may be configured on the conference terminal, and the conference terminal supports the speech recognition technology. In this case, when the user needs to start the clone interface, the user may make a voice "Please start the clone interface" that indicates starting. The voice that indicates starting may be collected by the audio collection function, and processed by the audio processing function and the intelligent processing function, to obtain the clone interface starting instruction. For another example, the image collection function, the image processing function, and the intelligent processing function may be configured on the conference terminal, and the conference terminal supports the posture recognition technology. The user may preset, on the conference terminal, a preset limb posture indicating to trigger the clone interface starting instruction. When a limb posture that is collected by the image collection function and recognized by the image processing function and the intelligent processing function matches the preset limb posture, the conference terminal may determine that the user has a requirement for starting the clone interface, and the clone interface starting instruction is generated. In an implementation, the preset limb posture may be a posture formed by any one or more parts of a body of the user, for example, may be a gesture posture formed by a finger, or may be a body posture jointly formed by an arm, a torso, and a leg of the user. For another example, the image collection function, the image processing function, and the intelligent processing function may be configured on the conference terminal, and the conference terminal supports the ranging technology or the target detection technology. The user may preset, on the conference terminal, a distance threshold for triggering the clone interface starting instruction. When a distance between the user (or a specified limb part of the user, such as a face of the user) and the display screen is determined, by using the ranging technology or the target detection technology and based on an image processed by the image collection function, the image processing function, and the intelligent processing function, to be less than the distance threshold, the conference terminal may determine that the user has a requirement for starting the clone interface, and the clone interface starting instruction is generated. The distance threshold may be set based on an application requirement. This is not specifically limited in this embodiment of this application.

Step 402: Display the clone interface on the conference terminal in response to the clone interface starting instruction.

In an implementation, the display area of the clone interface may be less than the display area of the cloned area of the graphical interface. In this implementation, the display area of the cloned area may be equal to or less than an area of the display screen of the conference terminal. In this case, the conference terminal may be a conference terminal that uses a large display screen to display information to participants in a conference scenario. Because the conference terminal has a large display screen, and the cloned area of the graphical interface on the conference terminal is excessively far away from the operator of the conference terminal, the operator of the conference terminal can control the conference terminal to display the clone interface. In addition, the cloned area of the graphical interface includes an area that cannot be touched by the operator on the graphical interface, so that the user controls the conference terminal by performing an operation on the clone interface. For example, as shown in FIG. 1, an area on the top of the graphical interface 101 is far away from the operator of the conference terminal, and it is difficult for the operator to perform an operation on the area on the top. In this case, the operator may control the conference terminal to display the clone interface 102, so that the clone interface 102 displays content displayed in all areas of the graphical interface 101 in the clone manner, to control the graphical interface 101 by using the clone interface 102. It can be learned from FIG. 1 that the display area of the clone interface is less than the display area of the cloned area (all areas of the graphical interface 101 in FIG. 1).

Figure 5:
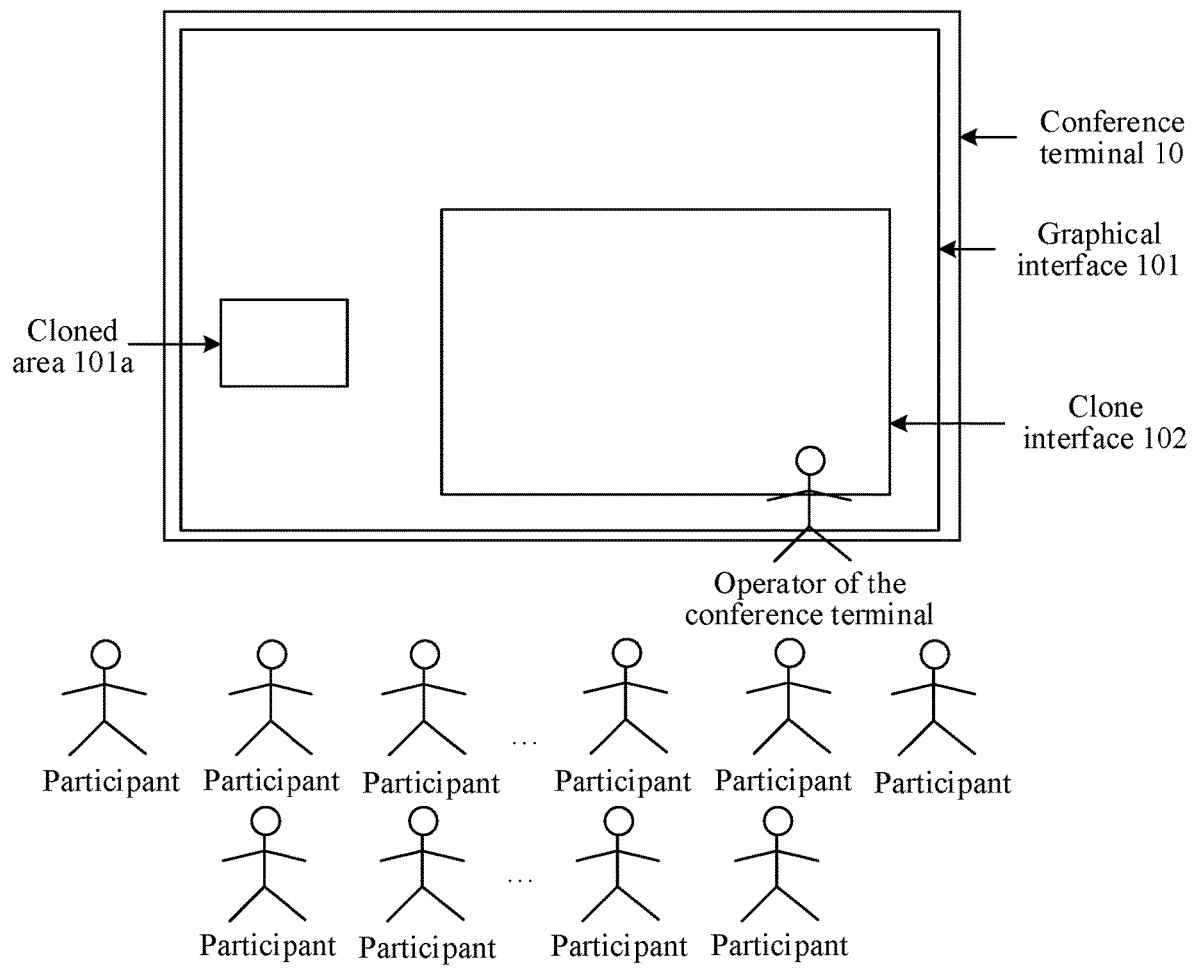
FIG. 5 is a schematic diagram of a clone interface according to an embodiment of this application.

In another implementation, the display area of the clone interface may be greater than the display area of the cloned area of the graphical interface. In this implementation, the display area of the cloned area may be less than the area of the display screen of the conference terminal. In this case, the conference terminal may be a conference terminal having high display density in at least the cloned area of the graphical interface. In this case, the clone interface display, in the clone manner, an area having high display density, so that magnification display of the area having high display density can be implemented, and the operator of the conference terminal can implement, on the clone interface on which magnification display is performed, an operation on the area having high display density, to reduce difficulty of performing an operation on the area having high display density by the operator. For example, as shown in FIG. 5, a cloned area 101a has high display density, and the operator controls the clone interface 102 to display, in the clone manner, content displayed in the cloned area 101a on the graphical interface 101, to implement magnification display of the cloned area 101a. It can be learned from FIG. 5 that the display area of the clone interface is greater than the display area of the cloned area 101a.

Figure 6:
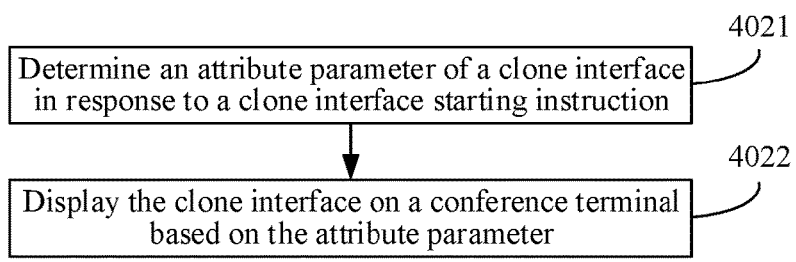
FIG. 6 is a flowchart of displaying a clone interface according to an embodiment of this application.

Optionally, as shown in FIG. 6, an implementation process of step 402 includes the following steps.

Step 4021: Determine an attribute parameter of the clone interface in response to the clone interface starting instruction.

The attribute parameter includes one or more of the following: a size, a display position, and a position of the cloned area. Each attribute parameter may be represented in a plurality of manners. For example, the size of the clone interface may be represented by a scaling ratio of the clone interface relative to the cloned area, or by a length and a width of the clone interface. The display position of the clone interface may be represented by a position of a boundary of the clone interface on the display screen, or by a position of a geometric center, a length, and a width of the clone interface on the display screen. The position of the cloned area may be represented by a position of a boundary of the cloned area on the display screen, or by a position of a geometric center, a length, and a width of the cloned area on the display screen.

Figure 7:
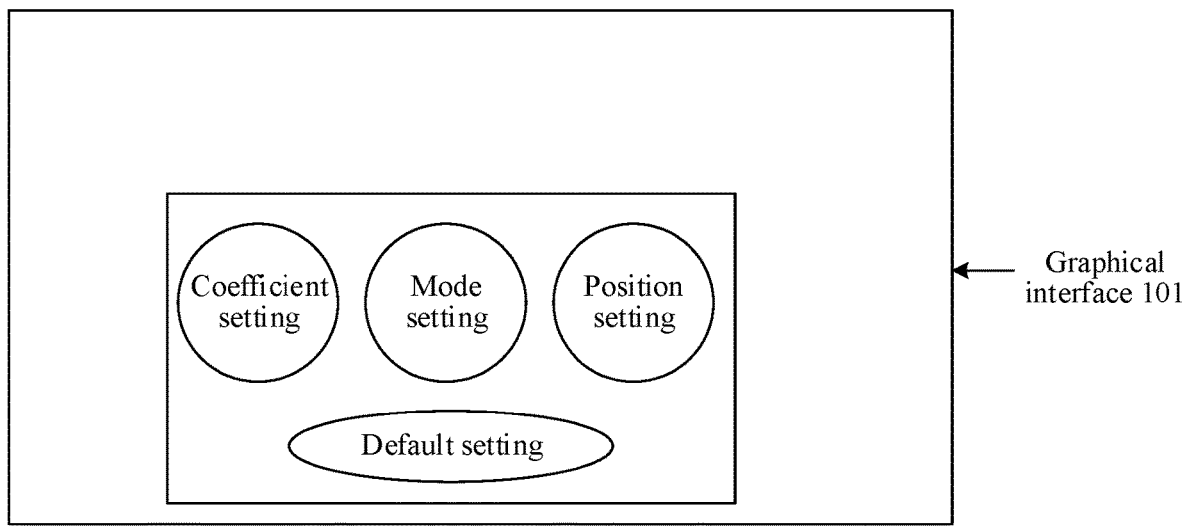
FIG. 7 is a schematic diagram of a setting interface according to an embodiment of this application.
Figure 8:
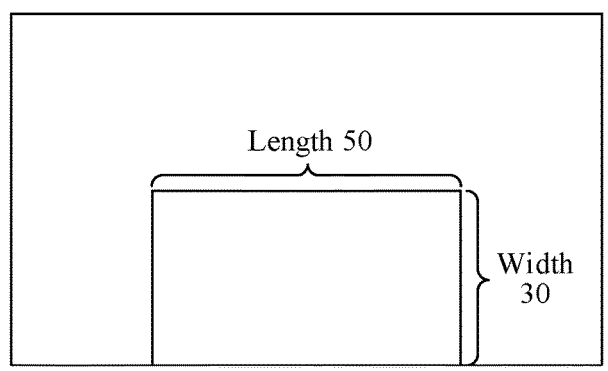
FIG. 8 is a schematic diagram of another clone interface according to an embodiment of this application.

The conference terminal may display a setting interface when being triggered, so that the user sets, on the setting interface, the attribute parameters such as the size of the clone interface, the display position of the clone interface, and the position of the cloned area. For example, the graphical interface of the conference terminal in FIG. 1 or FIG. 3 may display a setting interface shown in FIG. 7. The user may set a scaling coefficient of the clone interface by tapping a "coefficient setting" key on the setting interface, to set the size of the clone interface. For example, it is assumed that a length of the display screen is 100 and a width is 60, a scaling coefficient of the clone interface relative to the length of the display screen of the conference terminal in a length direction is set to 0.5, and a scaling coefficient relative to the width of the display screen of the conference terminal in a width direction is set to 0.5. In this case, a length of the clone interface may be set to 50, and a width may be set to 30 (as shown in FIG. 8). As shown in FIG. 7, the position of the cloned area may be set by tapping a "mode setting" key. For example, the cloned area is set to an upper part, a lower part, a left part, or a right part of the display screen, or the entire display screen. By tapping a "position setting" key, the display position of the clone interface may be set. For example, the clone interface may be set to be displayed in the center at the bottom of the display screen (as shown in FIG. 8). In addition, a default key is further disposed in FIG. 7. When the user taps the default key, it indicates that the attribute parameter is set based on a default parameter, and a default attribute parameter may include a default value of one or more attribute parameters. In addition, displaying of the setting interface may be triggered after the conference terminal receives the clone interface starting instruction, or may be triggered by a user operation. This is not specifically limited in this embodiment of this application. For example, after receiving the clone interface starting instruction, the conference terminal may first display the clone interface based on the default parameter. When the user considers that a display effect of the clone interface is unsatisfactory, the user may perform a specified operation to trigger displaying the setting interface, to adjust the attribute parameter of the clone interface by using the setting interface. In addition, the default value of the attribute parameter may be set based on an actual requirement. For example, the user may set the default value based on a habit of using the clone interface by the user. This is not specifically limited in this embodiment of this application.

When the conference terminal supports the voice recognition technology, the user may set the attribute parameter of the clone interface through voice control. After receiving a voice made by the user, the processor may perform semantic recognition on the voice, and correspond recognized semantic information to a control instruction, to set the attribute parameter of the clone interface by using the control instruction. Similarly, when the conference terminal supports the posture recognition technology, and when the limb posture that is of the user and that is recognized by the conference terminal matches the preset limb posture in the conference terminal, the attribute parameter of the clone interface may be set to a parameter corresponding to the preset limb posture, to set the attribute parameter of the clone interface through limb control.

In addition, when the conference terminal supports the intelligent technology, the conference terminal may perform automatic detection on the user, and set the attribute parameter of the clone interface based on a result of the automatic detection performed by the user. The following describes an implementation of determining the attribute parameter by using the intelligent technology.

In a manner of determining the size of the clone interface, the conference terminal may automatically detect a posture of the user by using the posture recognition technology, and then determine the size of the clone interface based on the posture of the user. For example, the conference terminal may automatically detect a length of the arm of the user by using the gesture recognition technology, and set both the length and the width of the clone interface to no greater than the length of the arm of the user.

In a manner of determining the display position of the clone interface, the conference terminal may automatically detect a posture of the user by using the posture recognition technology, then estimate, based on the posture of the user, a display screen area that is of the conference terminal and that can be touched by the user, and then determine the display position of the clone interface based on the display screen area of the clone interface. For example, the conference terminal may detect a length of the arm of the user, then estimate, based on the length of the arm, the display screen area that is of the conference terminal and that can be touched by the user, and then determine the display position of the clone interface in the display screen area that can be touched by the user.

Figure 9:
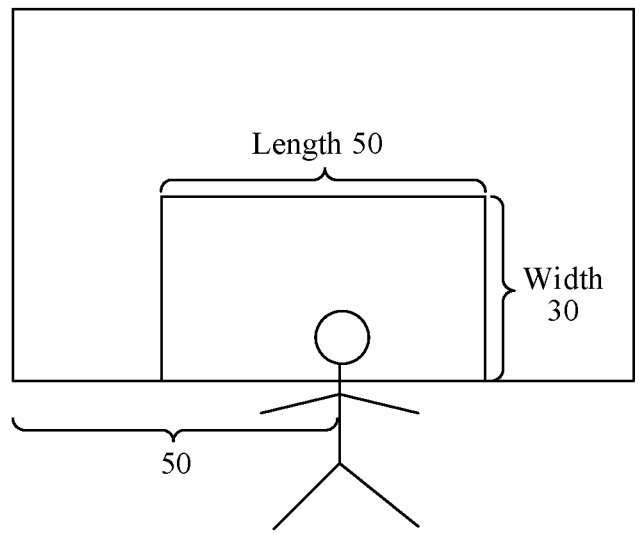
FIG. 9 is a schematic diagram of still another clone interface according to an embodiment of this application.

In another manner of determining the display position of the clone interface, the conference terminal may determine, by using a face detection technology and the target tracking technology, a position of an orthographic projection of a face of the user on the display screen of the conference terminal, and then determine the display position of the clone interface based on the position of the face. For example, the geometric center of the clone interface is determined to be a geometric center of the orthographic projection of the face of the user on the display screen of the conference terminal. In an example, as shown in FIG. 9, the geometric center of the orthographic projection of the face of the user on the display screen of the conference terminal is 50 centimeters away from a left frame of the display screen, the length of the clone interface is 50 centimeters, and the width of the clone interface is 30 centimeters. In this case, the geometric center of the clone interface may be set 50 centimeters away from the left frame of the display screen. In this implementation, after a camera collects, by using the image collection function, a video including a face image, the video may be sent to the processor. After the processor performs preprocessing on the video by using the image processing function, information such as a position of the face in an image frame of the video may be obtained based on a preprocessed video by using the intelligent processing function. In addition, in a process of obtaining the position of the face, an initial position of the face may be obtained by using the face detection technology, the face in the video may be tracked by using the target tracking technology (for example, Kalman filter), and then a face detection result and a face tracking result are matched by using matching algorithm (for example, the Hungarian matching algorithm, where a distance used during matching may be the Mahalanobis distance), to obtain the face position.

In a manner of determining the position of the cloned area of the graphical interface, the conference terminal may automatically detect a posture of the user by using the posture recognition technology, then estimate, based on the posture of the user, a display screen area that is of the conference terminal and that can be touched by the user, and then determine the position of the cloned area based on the display screen area. For example, the conference terminal may detect a length of the arm of the user, then estimate, based on the length of the arm, the display screen area that is of the conference terminal and that can be touched by the user, and then determine, as the cloned area, an area including an area that cannot be touched by the user. Similarly, the conference terminal may alternatively determine, by using the face detection technology and the target tracking technology, a position of an orthographic projection of a face of the user on the display screen of the conference terminal, and then estimate, based on the position of the orthographic projection, the display screen area that is of the conference terminal and that can be touched by the user, and then determine, as the cloned area, an area including an area that cannot be touched by the user.

Figure 10:
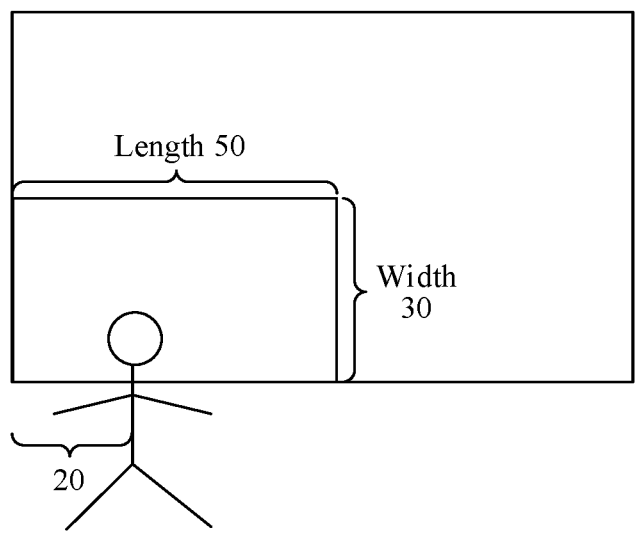
FIG. 10 is a schematic diagram of yet another clone interface according to an embodiment of this application.
Figure 11:
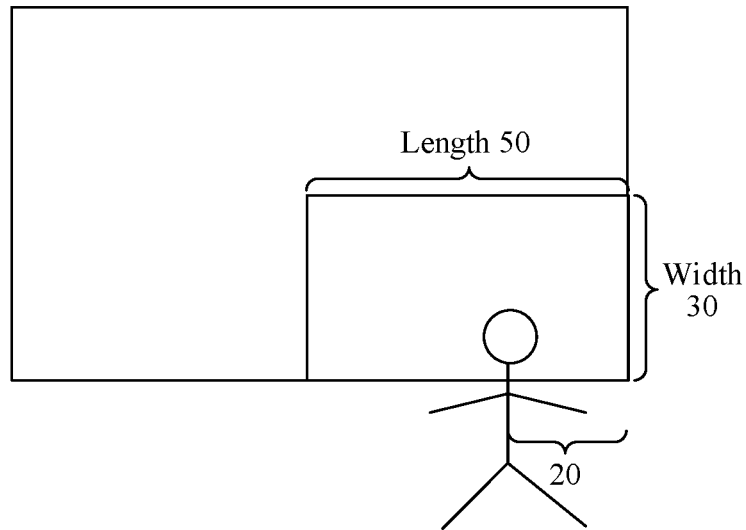
FIG. 11 is a schematic diagram of still another clone interface according to an embodiment of this application.

It should be noted that, the attribute parameter that is of the clone interface and that is determined in the foregoing manner may be considered as an initial attribute parameter. When the conference terminal is actually used, the conference terminal may further adjust the initial attribute parameter based on an actual situation. For example, when only some areas of the clone interface can be displayed on the display screen based on the initial attribute parameter, the conference terminal may perform fine-tuning on the display position of the clone interface based on the initial attribute parameter, so that the conference terminal can display all areas of the clone interface on a basis that the cloned area and the size are not changed. Alternatively, the size of the clone interface is properly reduced, so that all areas of the clone interface can be displayed at a display position indicated by the initial attribute parameter. In an example, as shown in FIG. 10, the geometric center of the orthographic projection of the face of the user on the display screen of the conference terminal is 20 centimeters away from the left frame of the display screen of the conference terminal, and the length of the clone interface is 50 centimeters. Based on a principle that the geometric center of the clone interface is on the geometric center of the orthographic projection of the face of the user on the display screen of the conference terminal, the geometric center of the clone interface originally needs to be set at a position 20 centimeters away from the left frame of the display screen. However, in this case, some areas of the clone interface cannot be displayed on the display screen. In this case, the conference terminal may perform fine-tuning on the display position of the clone interface, set the geometric center of the clone interface at a position 25 centimeters away from the left frame of the display screen, and keep the length of the clone interface and the cloned area unchanged. As shown in FIG. 11, a similar case also exists in FIG. 11. In this case, the conference terminal may also perform fine-tuning on the display position of the clone interface, set the geometric center of the clone interface at a position 25 centimeters away from a right frame of the display screen, and keep the length of the clone interface and the cloned area unchanged.

Step 4022: Display the clone interface on the conference terminal based on the attribute parameter.

After determining an attribute parameter of the clone interface, the conference terminal may display the clone interface on the conference terminal based on the attribute parameter. Optionally, an operation of determining the attribute parameter may be performed by the processor in the conference terminal. After determining the attribute parameter, the processor may send the attribute parameter to the display, and the display is configured to display the clone interface based on the attribute parameter. In addition, the display may display the clone interface by using a user interface (UI) control.

In a possible implementation, the display may display the clone interface in a superimposed manner on the graphical interface originally displayed on the display screen. In other words, both the graphical interface and the clone interface are displayed on the display screen, and the clone interface is displayed on an upper layer of the graphical interface, so that when viewing content displayed on the display screen, in an area in which the clone interface is displayed, the user can view only content on the clone interface. Alternatively, when the clone interface is displayed on the display screen, the graphical interface may not be displayed (for example, all areas on the display screen except areas of the clone interface are set to black or other colors), or the graphical interface on which processing has been performed may be displayed. Optionally, the processing on the graphical interface may include any one of the following: blurring processing and graffiti processing. When no graphical interface is displayed or the graphical interface on which processing has been performed is displayed, the content of the clone interface is displayed in an area in which content is displayed on the display screen, so that the user can focus on the clone interface when watching the display screen, and viewing efficiency of the clone interface is improved.

Step 403: Receive a user operation instruction executed on the clone interface.

When the clone interface is displayed on the conference terminal, the user may perform an operation on the clone interface, to control the conference terminal by using a user operation instruction triggered by the operation. Optionally, the user operation instruction may indicate the conference terminal to perform a conference-related operation. For example, the user operation instruction instructs any one of the following: entering a conference interface, quitting the conference interface, adjusting a presentation mode of a conference, adjusting presented content of the conference, and inputting conference content on the clone interface. It should be noted that content instructed by the user operation instruction may be adjusted based on an application requirement, and the application requirement is not listed herein.

Step 404: In response to the user operation instruction, perform, on the clone interface, an operation instructed by the user operation instruction.

After receiving the user operation instruction executed on the clone interface, the conference terminal may perform the operation instructed by the user operation instruction on the clone interface. In addition, because the clone interface is a clone of the cloned area, the operation performed on the clone interface actually acts on the cloned area. After receiving the operation performed on the clone interface, the conference terminal may perform the operation instructed by the user operation instruction on the clone interface and the cloned area, to control the conference terminal.

Step 405: Receive a clone interface adjustment instruction, where the clone interface adjustment instruction instructs to adjust the attribute parameter of the clone interface.

In a process of displaying the clone interface by the conference terminal, the conference terminal may further adjust the attribute parameter of the clone interface, and display the clone interface based on an adjusted attribute parameter, so that the user can perform an operation on the clone interface more conveniently. The conference terminal may adjust the attribute parameter of the clone interface based on an indication of the user, or may adjust the attribute parameter of the clone interface based on a display state of the conference terminal. For example, the conference terminal may identify a current display scenario of the conference terminal, and adjust the attribute parameter based on the display scenario.

Optionally, the attribute parameter of the clone interface may include one or more of the following: the size, the display position, and the position of the cloned area. In addition, the attribute parameter of the clone interface may be determined in the following manner.

The size of the clone interface may be determined based on any one of the following: a parameter input on the setting interface of the conference terminal, a parameter input through the voice control, a parameter input through the limb control, and a parameter automatically determined based on the posture of the user. For implementation processes of various implementations of determining the size of the clone interface, refer to corresponding descriptions in step 4021. Details are not described herein again.

The display position of the clone interface may be determined based on any one of the following: the parameter input on the setting interface of the conference terminal, the parameter input through the voice control, the parameter input through the limb control, a parameter automatically determined based on an area that can be touched by the user, and a parameter automatically determined based on the position of the orthographic projection of the face of the user on the display screen of the conference terminal. For implementation processes of various implementations of determining the display position of the clone interface, refer to corresponding descriptions in step 4021. Details are not described herein again.

The position of the cloned area may be determined based on any one of the following: the parameter input on the setting interface of the conference terminal, the parameter input through the voice control, the parameter input through the limb control, the parameter automatically determined based on the area that can be touched by the user, and the parameter automatically determined based on the position of the orthographic projection of the face of the user on the display screen of the conference terminal. For implementation processes of various implementations of determining the position of the cloned area, refer to corresponding descriptions in step 4021. Details are not described herein again.

When the attribute parameter of the clone interface is automatically determined based on the posture of the user, the position of the face, and the like, and the clone interface is displayed based on the attribute parameter, automatic display and automatic adjustment of the conference terminal can be implemented, and an intelligence degree of the conference terminal is further improved, to help further improve the interaction experience of controlling the conference terminal by the user.

Step 406: Display the clone interface based on the adjusted attribute parameter in response to the clone interface adjustment instruction.

After the attribute parameter of the clone interface is adjusted, the conference terminal may display the clone interface based on the adjusted attribute parameter in response to the clone interface adjustment instruction. In addition, for an implementation in which the conference terminal displays the clone interface based on the adjusted attribute parameter, correspondingly refer to corresponding descriptions in step 4022, and details are not described herein again.

Step 407: Receive a clone interface closing instruction, where the clone interface closing instruction instructs to stop displaying the clone interface on the conference terminal.

When the user does not need to use the clone interface, the user may trigger the clone interface closing instruction by performing a specified operation, so that the conference terminal stops displaying the clone interface on the conference terminal based on the clone interface closing instruction.

Optionally, the clone interface closing instruction may be triggered by using the touchscreen of the conference terminal, the clone interface starting instruction is triggered by using the key of the conference terminal, the clone interface starting instruction is the voice instruction, or the clone interface starting instruction is the limb instruction. In an implementation, the conference terminal may support the ranging technology. When the distance between the user (for example, the face of the user) and the display screen is greater than or equal to the distance threshold, or when the conference terminal detects that the distance between the user (for example, the face of the user) and the display screen is greater than or equal to the distance threshold, a status in which the distance between the user and the display screen is greater than or equal to the distance threshold is timed. In addition, when duration in which the distance between the user and the display screen is greater than or equal to the distance threshold reaches a duration threshold, the clone interface closing instruction instructing to close the clone interface may be triggered, where the clone interface closing instruction is the limb instruction. For example, when the distance between the user and the display screen is greater than or equal to 3 meters, the conference terminal may consider that the user is not in front of the display screen and has no requirement for an operation on the conference terminal, and may trigger the clone interface closing instruction. In addition, the clone interface closing instruction is triggered based on the distance between the user and the display screen, or based on the distance and duration, so that the conference terminal can automatically identify a current scenario, and intelligent control of the conference terminal based on the current scenario is implemented, automatic control of the conference terminal is implemented, and user experience of the conference terminal is further improved. For an implementation of the clone interface closing instruction, correspondingly refer to related descriptions of the clone interface starting instruction in step 4021. The following describes an implementation process of triggering the clone interface closing instruction based on the distance between the user and the display screen.

Figure 12:
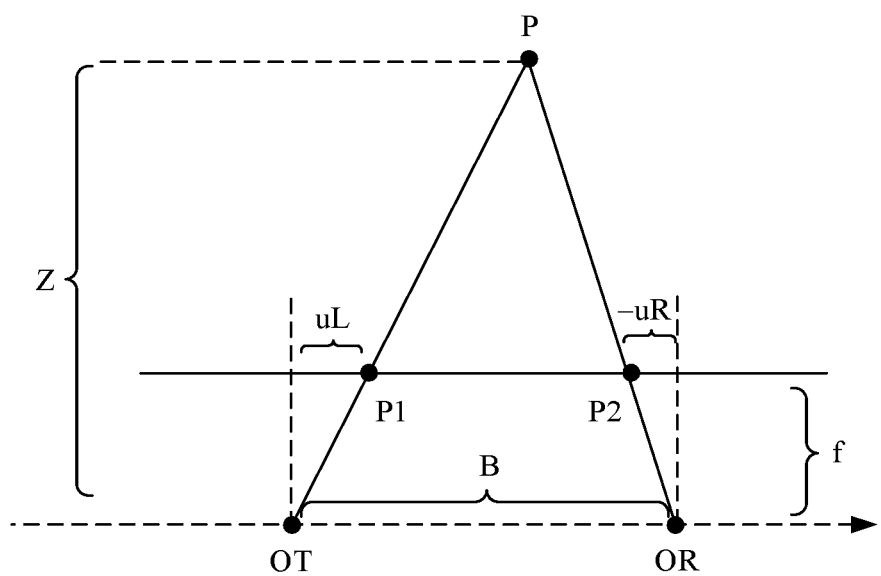
FIG. 12 is a schematic diagram of a principle of binocular ranging according to an embodiment of this application.

The ranging technology may be implemented by using a binocular camera ranging technology, the face detection technology, or the like. The following describes an implementation process of the ranging technology by using the binocular camera ranging technology and the face detection technology as an example. When the conference terminal implements the ranging technology by using the binocular camera ranging technology, two cameras may be disposed at a specified position (by using positioning as an example below for description) of the display screen, and the two cameras form a binocular camera. The binocular camera may obtain, by using processes such as camera calibration, binocular correction, binocular matching, and depth information calculation, a distance between a pixel in an image collected by the binocular camera and a plane on which the binocular camera is located. In addition, because a distance between the plane on which the binocular camera is located and the display screen is fixed, a distance between the pixel in the image collected by the binocular camera and the display screen may be obtained. The pixel in the image collected by the binocular camera may represent a user, and the distance collected by the binocular camera is a distance between the user and the plane on which the binocular camera is located, and a distance between the user and the display screen may be obtained based on the distance. Alternatively, the pixel in the image collected by the binocular camera may represent the face of the user, and the distance collected by the binocular camera is a distance between the face of the user and the plane on which the binocular camera is located, and a distance between the user and the display screen is obtained. The binocular camera can obtain an internal parameter and an external parameter of the binocular camera through the camera calibration, to prepare for the binocular correction. Through the binocular correction, the binocular camera can implement strict line correspondence between two images after distortion is eliminated, so that polar lines of the two images are on a same horizontal line, to prepare for the binocular matching. Through the binocular matching, the binocular camera can match corresponding points in an image collected by the two cameras in the binocular camera, to obtain a parallax. Through the depth information calculation, the binocular camera can calculate the depth information based on the parallax, and obtain the distance between the pixel in the image collected by the binocular camera and the plane on which the binocular camera is located. For a schematic diagram thereof, refer to FIG. 12. As shown in FIG. 12, a point P represents a point on an object to be measured, and a point OR and a point OT are respectively optical centers of the two cameras. Imaging points of the point P on photoreceptors of the two cameras are respectively a point P1 and a point P2, f is a camera focal length, B is a center distance between the two cameras, Z is the distance between the pixel in the image collected by the binocular camera and the plane on which the binocular camera is located, $Z=(f\times B)/d$, and parallax $d=|uL|+|uR|$.

When implementing the ranging technology by using the face detection technology, the conference terminal may obtain a size of the face of the user by using the face detection technology, and determine the distance between the face of the user and the display screen based on a preset correspondence between the size of the face and the distance. The correspondence between the size of the face and the distance represents a case in which when the size of the face is obtained at a specified position, the size of the face changes with the distance as a distance between the face and the specified position changes. For example, on an image with a resolution of 1080p, a size of a face 3 meters away from a camera is about 200 mm×200 mm, a closer distance between the camera and the face indicates a larger size of a face in the image, and a farther distance between the camera and the face indicates a smaller size of the face in the image. In addition, the size of the face in the image changes with the distance based on a specific rule, and the rule and representation are a correspondence between the size of the face and the distance. After the size of the face is detected by using the face detection technology, the correspondence may be queried based on a detected size of the face, the distance between the face and the camera is obtained, and the distance between the face and the display screen is obtained.

Step 408: In response to the clone interface closing instruction, stop displaying the clone interface on the conference terminal.

Figure 13:
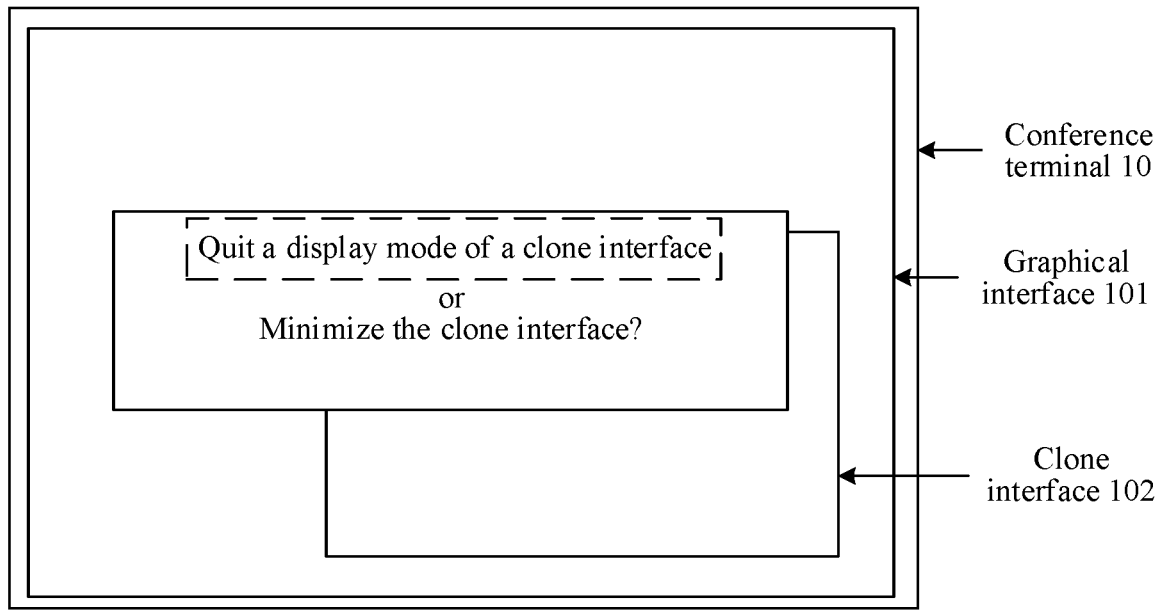
FIG. 13 is a schematic diagram of still another clone interface according to an embodiment of this application.

Optionally, stopping displaying the clone interface on the conference terminal may mean a message of quitting a display mode of the clone interface or minimizing the clone interface. When indication meanings are different, implementation processes of step 408 are different. In a possible implementation, an implementation process of step 408 may include: The conference terminal displays, in response to the clone interface closing instruction, a message of asking to quit the display mode of the clone interface or minimize the clone interface; when receiving an instruction that instructs to quit the display mode of the clone interface based on the message, the conference terminal stops displaying the clone interface on the conference terminal and quits the display mode of the clone interface; and when receiving an instruction that instructs to minimize the clone interface based on the message, the conference terminal stops displaying the clone interface on the conference terminal and runs the display mode of the clone interface in a background of the conference terminal. For example, as shown in FIG. 13, after receiving the clone interface closing instruction, the conference terminal may display, on the display screen, the message of asking to quit the display mode of the clone interface or minimize the clone interface. The user may choose to quit the display mode of the clone interface or minimize the clone interface by moving the dotted box in FIG. 13, so that the conference terminal performs a corresponding operation based on a selection of the user.

When the clone interface closing instruction is received, the message of asking to quit the display mode of the clone interface or minimize the clone interface is displayed, and the corresponding operation is performed for a response of the user to the message, so that the clone interface closing instruction can be executed based on a desire of the user, and operation experience of the user on the conference terminal is ensured.

In conclusion, in the conference terminal control method provided in this embodiment of this application, after receiving the clone interface starting instruction, the conference terminal can display the clone interface on the conference terminal in response to the clone interface starting instruction, and after receiving the user operation instruction executed on the clone interface, in response to the user operation instruction, the conference terminal can perform, on the clone interface, the operation instructed by the user operation instruction. Because the clone interface can display content displayed on the graphical interface in a clone manner, the user can implement an operation on the graphical interface by performing the operation on the clone interface, and can further control the conference terminal. In comparison with a conventional technology, no terminal needs to be additionally configured for the conference terminal, and costs of controlling the conference terminal are reduced. In addition, by performing the operation on the clone interface, an operation on the cloned area of the graphical interface can be implemented, operation difficulty in an area of the graphical interface is reduced, and the interaction experience of controlling the conference terminal by the user is ensured. In addition, the conference terminal control method implements the intelligent control of the conference terminal by combining a plurality of intelligent technologies such as the target detection technology, the target tracking technology, the speech recognition technology, the posture recognition technology, and the ranging technology, and further ensures the interaction experience of controlling the conference terminal by the user.

It should be noted that a sequence of steps of the conference terminal control method provided in this embodiment of this application may be properly adjusted, and steps may be correspondingly added or deleted based on a situation. Any variation method readily figured out by a person skilled in the art within the technical scope disclosed in this application shall fall within the protection scope of this application, and details are not described herein again.

Figure 14:
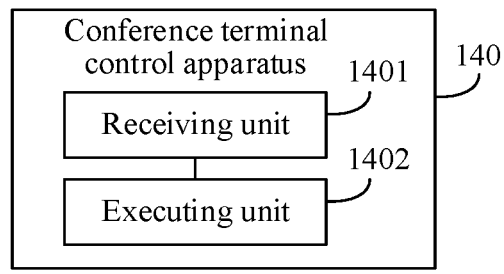
FIG. 14 is a schematic diagram of a structure of a conference terminal control apparatus according to an embodiment of this application.

FIG. 14 shows a conference terminal control apparatus provided in this application. The apparatus is deployed in the conference terminal 10 in FIG. 1 or FIG. 3, and the conference terminal displays a graphical interface. As shown in FIG. 14, a conference terminal control apparatus 140 includes:

a receiving unit 1401, configured to receive a clone interface starting instruction, where the clone interface starting instruction instructs to display a clone interface of the graphical interface on the conference terminal; and an executing unit 1402, configured to display the clone interface on the conference terminal in response to the clone interface starting instruction, where the receiving unit 1401 is further configured to receive a user operation instruction executed on the clone interface; and the executing unit 1402 is further configured to: in response to the user operation instruction, perform, on the clone interface, an operation instructed by the user operation instruction.

Optionally, a display area of the clone interface is less than a display area of a cloned area of the graphical interface.

Optionally, the display area of the clone interface is greater than the display area of the cloned area of the graphical interface.

Optionally, the clone interface starting instruction is triggered by using a touchscreen of the conference terminal, the clone interface starting instruction is triggered by using a key of the conference terminal, the clone interface starting instruction is a voice instruction, or the clone interface starting instruction is a limb instruction.

Optionally, the executing unit 1402 is configured to: determine an attribute parameter of the clone interface in response to the clone interface starting instruction, where the attribute parameter includes one or more of the following: a size, a display position, and a position of the cloned area of the graphical interface; and display the clone interface on the conference terminal based on the attribute parameter.

Optionally, the receiving unit 1401 is further configured to receive a clone interface adjustment instruction, where the clone interface adjustment instruction instructs to adjust the attribute parameter of the clone interface, and the attribute parameter includes one or more of the following: the size, the display position, and the position of the cloned area of the graphical interface; and the executing unit 1402 is further configured to display the clone interface based on an adjusted attribute parameter in response to the clone interface adjustment instruction.

Optionally, the size of the clone interface is determined based on any one of the following: a parameter input on a setting interface of the conference terminal, a parameter input through voice control, a parameter input through limb control, and a parameter automatically determined based on a posture of a user.

Optionally, the display position of the clone interface is determined based on any one of the following: the parameter input on the setting interface of the conference terminal, the parameter input through the voice control, the parameter input through the limb control, a parameter automatically determined based on an area that can be touched by the user, and a parameter automatically determined based on a position of an orthographic projection of a face of the user on a display screen of the conference terminal.

Optionally, the position of the cloned area is determined based on any one of the following: the parameter input on the setting interface of the conference terminal, the parameter input through the voice control, the parameter input through the limb control, the parameter automatically determined based on the area that can be touched by the user, and the parameter automatically determined based on the position of the orthographic projection of the face of the user on the display screen of the conference terminal.

Optionally, the receiving unit 1401 is further configured to receive a clone interface closing instruction, where the clone interface closing instruction instructs to stop displaying the clone interface on the conference terminal; and the executing unit 1402 is further configured to: in response to the clone interface closing instruction, stop displaying the clone interface on the conference terminal.

Optionally, the executing unit 1402 is further configured to: display, in response to the clone interface closing instruction, a message of asking to quit a display mode of the clone interface or minimize the clone interface.

Optionally, the user operation instruction instructs any one of the following: entering a conference interface, quitting the conference interface, adjusting a presentation mode of a conference, adjusting presented content of the conference, and inputting conference content on the clone interface.

Optionally, the executing unit 1402 is further configured to: when displaying the clone interface on the conference terminal, display the graphical interface on which processing has been performed, where the processing includes any one of the following: blurring processing and graffiti processing.

In conclusion, in the conference terminal control apparatus provided in this embodiment of this application, after receiving the clone interface starting instruction, the conference terminal can display the clone interface on the conference terminal in response to the clone interface starting instruction, and after receiving the user operation instruction executed on the clone interface, in response to the user operation instruction, the conference terminal can perform, on the clone interface, the operation instructed by the user operation instruction. Because the clone interface can display content displayed on the graphical interface in a clone manner, the user can implement an operation on the graphical interface by performing the operation on the clone interface, and can further control the conference terminal. In comparison with a conventional technology, no terminal needs to be additionally configured for the conference terminal, and costs of controlling the conference terminal are reduced. In addition, by performing an operation on the clone interface, an operation on the cloned area of the graphical interface can be implemented, operation difficulty in an area of the graphical interface is reduced, and interaction experience of controlling the conference terminal by the user is ensured. In addition, the conference terminal control apparatus implements the intelligent control of the conference terminal by combining a plurality of intelligent technologies such as a target detection technology, a target tracking technology, a speech recognition technology, a posture recognition technology, and a ranging technology, and further ensures the interaction experience of controlling the conference terminal by the user.

A person skilled in the art may clearly understand that, for a purpose of convenient and brief description, for detailed working processes of the foregoing apparatus and modules, refer to corresponding processes in the foregoing method embodiments. Details are not described herein again.

Figure 15:
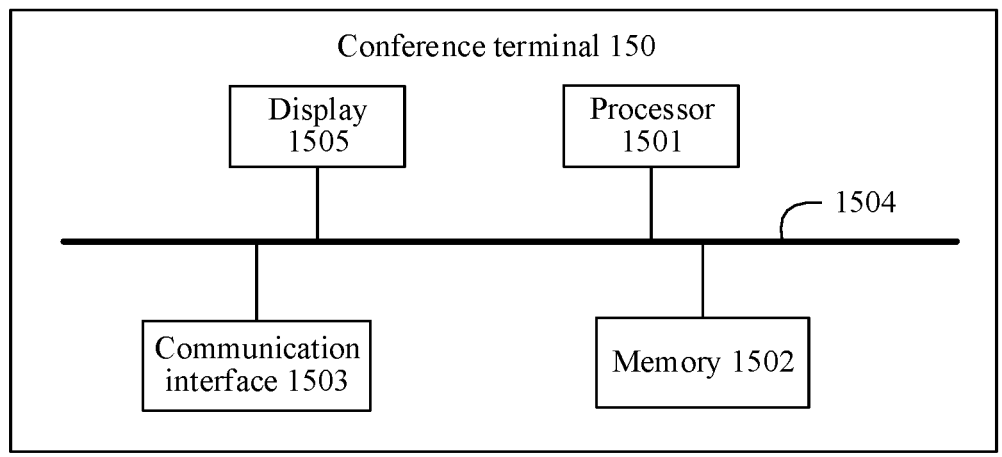
FIG. 15 is a schematic diagram of a structure of a conference terminal according to an embodiment of this application.

An embodiment of this application provides a conference terminal. FIG. 15 is an example of a diagram of a possible hardware architecture of the conference terminal, which may be configured to implement the method in embodiments of this application. As shown in FIG. 15, a conference terminal 150 may include a processor 1501, a memory 1502, a communication interface 1503, a bus 1504, and a display 1505. Optionally, the conference terminal 150 may further include a camera, a microphone, and the like. In the conference terminal, there may be one or more processors 1501, and FIG. 15 shows only one processor 1501. Optionally, the processor 1501 may be a central processing unit (CPU). If the conference terminal has a plurality of processors 1501, types of the plurality of processors 1501 may be different or may be the same. Optionally, the plurality of processors of the conference terminal may further be integrated into a multi-core processor.

The memory 1502 stores computer instructions and data, and the memory 1502 may store computer instructions and data that are required for implementing the conference terminal control method provided in this application. The memory 1502 may be any one or any combination of the following storage media: a non-volatile memory. (For example, a read-only memory (ROM)), a solid-state drive (SSD), a hard disk drive (HDD), an optical disc, or the like, and a volatile memory.

The communication interface 1503 may be any one or any combination of the following components: a component that has a network access function, such as a network interface (for example, an Ethernet interface) and a wireless network adapter.

The communication interface 1503 is configured to perform data communication between the conference terminal and another node or another conference terminal or device.

FIG. 15 also depicts the bus 1504 as an example. The bus 1504 may connect the processor 1501 to the memory 1502 and the communication interface 1503. In this way, by using the bus 1504, the processor 1501 may access the memory 1502, and may further perform data interaction with another node or another conference terminal by using the communication interface 1503.

The display 1505 is configured to display a graphical interface. Content in the graphical interface may include graphics, text, icons, videos, and any combination thereof. When a display screen of the display 1505 is a touch display screen, the display screen further has a capability of collecting a touch signal on or above a surface of the display screen. The touch signal may be used as a control signal and input to the processor 1501 for processing. In this case, the display screen may be further configured to provide a virtual button and/or a virtual keyboard, which is also referred to as a soft button and/or a soft keyboard. In some embodiments, there may be one display screen, and the display screen is disposed on a front panel of the conference terminal 150. In some other embodiments, there may be at least two display screens, and the display screens are respectively disposed on different surfaces of the conference terminal 150 or are in a folded design. In still some other embodiments, the display screen may be a flexible display screen, and is disposed on a curved surface or a folded surface of the conference terminal 150. The display screen may even be set as a non-rectangular irregular pattern, namely, a special-shaped screen. The display screen may be a liquid crystal display array (LCD) display screen or an organic light-emitting diode (OLED) display screen.

In this application, the conference terminal executes the computer instructions in the memory 1502, to implement the conference terminal control method provided in this application. For example, the method includes: receiving a clone interface starting instruction, where the clone interface starting instruction instructs to display a clone interface of the graphical interface on the conference terminal; displaying the clone interface on the conference terminal in response to the clone interface starting instruction; receiving a user operation instruction executed on the clone interface; and in response to the user operation instruction, performing, on the clone interface, an operation instructed by the user operation instruction. In addition, for an implementation process in which the conference terminal executes, by executing the computer instructions in the memory 1502, the steps of the conference terminal control method provided in this application, refer to corresponding descriptions in the foregoing method embodiments.

An embodiment of this application further provides a computer-readable storage medium, where the computer readable storage medium is a non-volatile computer-readable storage medium, the computer-readable storage medium includes program instructions, and when the program instructions are run on a computer device, the computer device is enabled to perform the conference terminal control method provided in embodiments of this application.

An embodiment of this application further provides a computer program product including instructions. When the computer program product runs on a computer, the computer is enabled to perform the conference terminal control method provided in embodiments of this application.

A person of ordinary skill in the art may understand that all or some of the steps of the foregoing embodiments may be implemented by hardware or a program instructing related hardware, where the program may be stored in a computer-readable storage medium, and the storage medium may be a read-only memory, a magnetic disk, an optical disc, or the like.

In embodiments of this application, terms "first", "second", and "third" are merely used for a purpose of description, and shall not be understood as an indication or implication of relative importance. In addition, a term "at least one" means one or more, and a term "a plurality of" means two or more, unless expressly defined otherwise.

A term "and/or" in this application describes only an association relationship between associated objects and indicates that there may be three relationships. For example, A and/or B may indicate the following three cases: Only A exists, both A and B exist, and only B exists. In addition, the character "/" generally indicates that the associated objects are in an "or" relationship.

The foregoing descriptions are merely optional embodiments of this application, but are not intended to limit this application. Any modification, equivalent replacement, or improvement made without departing from the concept and principle of this application shall fall within the protection scope of this application.

What is claimed is:

1. A conference terminal control method, applied to a conference terminal, the method comprising:
receiving a clone interface starting instruction instructing to display a clone interface of a graphical interface on the conference terminal;
displaying the clone interface on the conference terminal in response to the clone interface starting instruction;
receiving a user operation instruction executed on the clone interface; and
in response to the user operation instruction, performing, on the clone interface, an operation instructed by the user operation instruction.

2. The method of claim 1, wherein a display area of the clone interface is less than a display area of a cloned area of the graphical interface.

3. The method of claim 1, wherein a display area of the clone interface is greater than a display area of a cloned area of the graphical interface.

4. The method of claim 1, wherein the clone interface starting instruction is triggered by using a touchscreen of the conference terminal, the clone interface starting instruction is triggered by using a key of the conference terminal, the clone interface starting instruction is a voice instruction, or the clone interface starting instruction is a limb instruction.

5. The method of claim 1 wherein the displaying the clone interface on the conference terminal in response to the clone interface starting instruction comprises:
determining an attribute parameter of the clone interface in response to the clone interface starting instruction, wherein the attribute parameter comprises one or more of the following: a size, a display position, or a position of the cloned area of the graphical interface; and
displaying the clone interface on the conference terminal based on the attribute parameter.

6. The method of claim 5, wherein the size of the clone interface is determined based on any one of the following: a parameter input on a setting interface of the conference terminal, a parameter input through voice control, a parameter input through limb control, or a parameter automatically determined based on a user posture.

7. The method of claim 5, wherein the display position of the clone interface is determined based on any one of the following: a parameter input on a setting interface of the conference terminal, a parameter input through voice control, a parameter input through limb control, a parameter automatically determined based on a user-touchable area, or a parameter automatically determined based on a position of an orthographic projection of a user's face on a display screen of the conference terminal.

8. The method of claim 5, wherein the position of the cloned area is determined based on any one of the following: a parameter input on a setting interface of the conference terminal, a parameter input through voice control, a parameter input through limb control, a parameter automatically determined based on a user-touchable area, or a parameter automatically determined based on a position of an orthographic projection of a user's face on a display screen of the conference terminal.

9. The method of claim 1, wherein after the displaying the clone interface on the conference terminal in response to the clone interface starting instruction, the method further comprises:
receiving a clone interface adjustment instruction instructing to adjust the attribute parameter of the clone interface, wherein the attribute parameter comprises one or more of the following: the size, the display position, or the position of the cloned area of the graphical interface; and displaying the clone interface based on an adjusted attribute parameter in response to the clone interface adjustment instruction.

10. The method of claim 1, the method further comprising:
receiving a clone interface closing instruction instructing to stop displaying the clone interface on the conference terminal; and
in response to the clone interface closing instruction, stopping displaying the clone interface on the conference terminal.

11. The method of claim 10, wherein before the stopping displaying the clone interface on the conference terminal, the method further comprises:
displaying, in response to the clone interface closing instruction, a message of asking to quit a display mode of the clone interface or minimize the clone interface.

12. The method of claim 1, wherein the user operation instruction instructs any one of the following: entering a conference interface, quitting the conference interface, adjusting a presentation mode of a conference, adjusting presented content of the conference, or inputting conference content on the clone interface.

13. The method of claim 1, the method further comprising:
when displaying the clone interface on the conference terminal, displaying the graphical interface on which processing has been performed, wherein the processing comprises any one of the following: blurring processing or graffiti processing.

14. A conference terminal, comprising: a display screen, a memory, and a processor, wherein the memory stores program instructions, and the processor runs the program instructions to perform the method comprising:
receiving a clone interface starting instruction instructing to display a clone interface of a graphical interface on the conference terminal;
displaying the clone interface on the conference terminal in response to the clone interface starting instruction;
receiving a user operation instruction executed on the clone interface; and
in response to the user operation instruction, performing, on the clone interface, an operation instructed by the user operation instruction.

15. The method of claim 14, wherein a display area of the clone interface is less than a display area of a cloned area of the graphical interface.

16. The method of claim 15, wherein a display area of the clone interface is greater than a display area of a cloned area of the graphical interface.

17. A non-transitory computer-readable storage medium, comprising program instructions, wherein when the program instructions are run on a computer device, the computer device is enabled to perform the method comprising:
receiving a clone interface starting instruction instructing to display a clone interface of a graphical interface on the conference terminal;
displaying the clone interface on the conference terminal in response to the clone interface starting instruction;
receiving a user operation instruction executed on the clone interface; and
in response to the user operation instruction, performing, on the clone interface, an operation instructed by the user operation instruction.

18. The non-transitory computer-readable storage medium of claim 17, wherein a display area of the clone interface is less than a display area of a cloned area of the graphical interface.

* * * * *